(12) United States Patent  
Buesing (10) Patent No.: US 11,768,062 B2
(45) Date of Patent: Sep. 26, 2023

(54) GUIDED MISSILE WITH AT LEAST ONE ENGINE FOR PRODUCING FORWARD THRUST

(71) Applicant: AIRBUS HELICOPTERS DEUTSCHLAND GMBH, Donauworth (DE)

(72) Inventor: Moritz Buesing, Augsburg (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 0 days.

(21) Appl. No.: 17/575,938

(22) Filed: Jan. 14, 2022

(65) Prior Publication Data

US 2022/0299299 A1 Sep. 22, 2022

(30) Foreign Application Priority Data

Mar. 17, 2021 (EP) .................................. 21400006

(51) Int. Cl.
*F42B 10/64* (2006.01)

(52) U.S. Cl.
CPC .................... *F42B 10/64* (2013.01)

(58) Field of Classification Search
CPC ..................................................... F42B 10/64
See application file for complete search history.

(56) References Cited

U.S. PATENT DOCUMENTS

| 3,028,122 A | 4/1962 | Riebe et al. |
| 4,836,470 A | 6/1989 | Criswell |
| 5,154,370 A | 10/1992 | Cox et al. |
| 5,677,508 A | 10/1997 | Finn et al. |
| 6,142,421 A * | 11/2000 | Palmer .................... F42B 15/00 244/49 |
| 6,923,404 B1 | 8/2005 | Liu et al. |
| 2005/0211827 A1 | 9/2005 | Barocela |
| 2010/0314489 A1* | 12/2010 | Buckland ................ F42B 10/14 244/3.27 |

FOREIGN PATENT DOCUMENTS

| CN | 107063003 A | 8/2017 | |
| EP | 0768509 A2 * | 4/1997 | .............. F42B 15/10 |
| WO | WO-2020159412 A1 * | 8/2020 | .............. F42B 10/64 |

OTHER PUBLICATIONS

European Search Report for European Application No. EP 21400006.9 Completed by the European Patent Office, dated Oct. 18, 2021, 9 pages.

* cited by examiner

*Primary Examiner* — Tien Q Dinh
*Assistant Examiner* — Katherine June Bolek
(74) *Attorney, Agent, or Firm* — BROOKS KUSHMAN P.C.

(57) ABSTRACT

A guided missile with a sleeve-shaped missile body, at least one engine for producing forward thrust, at least one flight direction control device, and at least one aerodynamic extension. The least one flight direction control device is rotatably mounted to a top area and/or a bottom area of the sleeve-shaped missile body for adjusting a flight direction of the guided missile. The least one aerodynamic extension comprises an aerodynamic cross-sectional shape that is arranged on a left-hand side and/or a right-hand side of the sleeve-shaped missile body.

20 Claims, 6 Drawing Sheets

GUIDED MISSILE WITH AT LEAST ONE ENGINE FOR PRODUCING FORWARD THRUST

CROSS-REFERENCE TO RELATED APPLICATIONS

This application claims priority to European patent application No. EP 21400006.9 filed on Mar. 17, 2021, the disclosure of which is incorporated in its entirety by reference herein.

TECHNICAL FIELD

The present embodiments relate to a guided missile with at least one engine for producing forward thrust and at least one flight direction control device.

BACKGROUND

Guided missiles are generally designed for a variety of demanding applications, which often require accurate kinematic information including missile velocity, acceleration, and position information to allow in-flight steering and targeting adjustments. Such accurate kinematic information is particularly important in military applications involving guided missiles flying at low altitude.

In general, guided missiles may be divided into four different missile types: air-to-air, surface-to-surface, surface-to-air, and air-to-surface missiles. For example, a respective guided missile can be launched from a ground vehicle, a ship, a submarine, and/or an aircraft. Such a guided missile usually consists of four elements: a payload, a propulsion system to accelerate the payload to a required velocity, a guidance and control system that guides the missile along a pre-programmed trajectory to a pre-determined destination, and an overall structure that holds everything together.

More specifically, a guided missile is a self-contained flight vehicle that carries its fuel internally and boosts its payload to high velocity. A respective flight plan or trajectory of the guided missile is programmed prior to launch into a guidance computer of a respective guidance and control system of the guided missile, which controls and steers the guided missile in order to maintain an associated trajectory. After burnout of the fuel, the payload may continue on a predominantly unpowered, ballistic trajectory to a given target.

Usually, three main flight phases of a given guided missile occur before a possible target interaction: a "start phase", a "travel phase", and a "final phase". During the "start phase", the guided missile missiles' propulsion system burns fuel, i.e., respective liquid or solid propellants, to generate thrust in order to launch the guided missile, which is subsequently boosted and accelerated to its maximum velocity. During the "travel phase", the guided missile is flying after boost with or without active engines. During the "final phase", the guided missile is approaching the target, often without active engines, or with the help of special engines.

However, during the "final phase" the guided missile may be required to perform high G maneuvers in order to approach a given target closely, and/or to correct for evasive maneuvers, e.g., in order to avoid anti-missile defenses. This requires high control authority and high lift in respectively desired directions.

Furthermore, a "loitering phase" may take place between the "travel phase" and the "final phase". During such a "loitering phase", the guided missile may glide at comparably low speed for long time periods in order to collect intelligence, to find a target, or to maneuver into an advantageous approach vector. In this phase, generation of lift efficiency is essential.

Exemplary guided missiles are e.g., described in the documents US 2005/0211827 A1, U.S. Pat. Nos. 6,923,404 B1 and 5,154,370 A. More specifically, the document US 2005/0211827 A1 describes a high-speed missile which includes a fuselage member and an engine that is carried by the fuselage member and capable of thrusting the missile during flight. A wing actuator is carried by the fuselage member and a wing member is pivotably movable by the wing actuator. The wing member is extending from a lower surface of the fuselage member. Three fins are attached to an aft portion of the fuselage member.

The document U.S. Pat. No. 6,923,404 B1 describes an unmanned air vehicle apparatus with a body and a body-conformal wing. The body-conformal wing is configured to variably sweep from a closed position to a fully deployed position by rotating about a pivot point. The unmanned air vehicle apparatus may have deployable tail fins.

The document U.S. Pat. No. 5,154,370 A describes an air-to-surface missile comprising a triangular cross section fuselage, and three folding tail fins. The missile is propelled by three solid fueled rocket engines which are stacked in the back of the fuselage in the form of a triangle or by a single solid fueled rocket engine which is housed in the back of the fuselage. A deployable wing is stowed on one of the three sides of the fuselage.

However, all of these documents describe guided missiles with rotatable wings that are fixed on a top or bottom section of a respective missile, which rotate to various sweep angles in order to adjust the sweep angle of the guided missile. Moreover, all of these guided missiles have a conventional cylindrical or triangular fuselage body, which is not optimized in terms of aerodynamic efficiency.

In contrast thereto, the document U.S. Pat. No. 4,836,470 A describes a reusable aerospace vehicle having multiple propulsion systems on a rotatable wing member, which is capable of take-off and subsequent landing. A plurality of propulsion systems is distributed about the wing member for providing thrust and aerodynamic control. Rocket engines may be mounted inside the wing member or retractably mounted to the wing surface and capable of being retracted into the wing member. Appropriate chambers within the wing member may be provided for crew and passenger accommodations.

However, this aerospace vehicle is not a guided missile. Instead, it is provided to be reusable and to transport passengers.

SUMMARY

It is, therefore, an object of the present disclosure to provide a new guided missile which is improved in terms of aerodynamic efficiency and enables high control authority and high lift in respectively desired directions.

This objective is solved by a guided missile comprising the features of claim 1. More specifically, the guided missile comprises a sleeve-shaped missile body that extends along a longitudinal axis from a front section to a rear section, along a height axis from a bottom area to a top area, and along a transversal axis from a left-hand side to a right-hand side. The guided missile further comprises at least one engine for producing forward thrust, at least one flight direction control device that is rotatably mounted to the top area and/or the bottom area of the sleeve-shaped missile body for adjusting a flight direction of the guided missile, and at least one aerodynamic extension with an aerodynamic cross-sectional shape that is arranged on the left-hand side and/or the right-hand side of the sleeve-shaped missile body. The at least one engine is accommodated inside the sleeve-shaped missile body and comprises a nozzle that is arranged at the rear section of the sleeve-shaped missile body. The at least one aerodynamic extension forms together with the sleeve-shaped missile body a lift generating airfoil at an angle oblique to the longitudinal axis for producing additional lift during flight.

Advantageously, the guided missile creates comparatively large lift vectors, in particular in an oblique flight configuration. This is enabled by the at least one aerodynamic extension of the sleeve-shaped missile body that forms an efficient airfoil at an oblique angle. Preferably, at least one of the left-hand side and the right-hand side of the sleeve-shaped missile body is extended and, accordingly, forms a trailing edge of an airfoil.

More specifically, by means of the at least one aerodynamic extension the whole sleeve-shaped body of the guided missile preferably becomes a lift generating airfoil with a comparatively large reference area and comparatively large effective wing span. This enables efficient generation of large lift vectors. Furthermore, tight turns of the guided missile are enabled in a final phase of flight, i.e., close to target interaction, which is advantageous in pursuing a target, or avoiding anti-missile defenses. Moreover, if loitering phases are envisaged in flight operation, the lift generating airfoil with the comparatively large reference area and comparatively large effective wing span enables longer loitering periods and thereby provides more time for gathering intelligence, searching for a target, or flying to a desired approach vector.

Preferably, an underlying number of provided flight direction control devices is application-specific and/or flight mission specific. More specifically, a single flight direction control device may be mounted at the rear section of the guided missile. Furthermore, a single flight direction control device may be mounted at the front section of the guided missile. Likewise, a single flight direction control device may be mounted in a center section of the guided missile. These flight direction control devices may e.g., be arranged in pairs. Furthermore, flight direction control devices may be arranged by groups of three or more flight direction control devices. By way of example, the flight direction control devices may by implemented by means of any suitable primary and secondary control surfaces, such as slats, leading edge flaps, spoilers, air brakes, morphing airfoils, small rocket engines, gas generators or explosives for control, etc.

Advantageously, the guided missile may comprise suitable sensors and engines. More particularly, each engine may be a rocket engine, an air breathing rocket, a turbine engine, a ram-jet, a scram-jet, an electrically powered fan or propeller, or any other engine that is suitable for use on a guided missile. Furthermore, each engine may be cylindrical, ellipsoidal, or comprise any other shape approaching a section of an airfoil.

According to one aspect, the at least one flight direction control device is of the rudder type and rotatable around the height axis by a rotation angle comprised between −45° and 135°.

Preferably, one or more flight direction control devices are arranged such that they can swivel from a straight position to an oblique position in order to stabilize and control the guided missile in an oblique direction. A rotation of a respective flight direction control device preferably causes a transition from a flight configuration with an underlying flight direction being approximately parallel to the longitudinal axis of the guided missile into a different flight configuration with a flight direction being at a large angle, e.g., 20° to 90°, to the longitudinal axis of the guided missile.

According to one aspect, the at least one aerodynamic extension with the aerodynamic cross-sectional shape is arranged on one of the left-hand side and the right-hand side of the sleeve-shaped missile body. A curved extension is arranged on the other one of the left-hand side and the right-hand side of the sleeve-shaped missile body.

Advantageously, a curved extension in addition to the at least one aerodynamic extension may be more efficient for a flight with subsonic speed.

According to one aspect, a cross-sectional profile of the curved extension, the sleeve-shaped missile body and the at least one aerodynamic extension together form a wing airfoil.

According to one aspect, the at least one aerodynamic extension comprises a sharp edge.

The at least one aerodynamic extension comprising a sharp edge may be advantageous for a flight with supersonic speed. Advantageously, one aerodynamic extension comprising a sharp edge may be arranged on the left-hand side and one additional aerodynamic extension comprising a sharp edge may be arranged on the right-hand side of the sleeve-shaped missile body.

According to one aspect, at least one first flight direction control device of the at least one flight direction control device is rotatably mounted to the top area of the sleeve-shaped missile body. At least one second flight direction control device of the at least one flight direction control device is rotatably mounted to the bottom area of the sleeve-shaped missile body.

According to one aspect, the at least one first flight direction control device and the at least one second flight direction control device comprise rotation axes which are arranged coaxially or at an oblique angle.

According to one aspect, the at least one first flight direction control device and the at least one second flight direction control device are arranged in, or close to, the front section of the sleeve-shaped missile body.

According to one aspect, the at least one first flight direction control device and the at least one second flight direction control device are arranged in, or close to, the rear section of the sleeve-shaped missile body.

Advantageously, respective flight direction control devices are arranged on the top area and/or the bottom area of the sleeve-shaped missile body. Preferably, flight direction control devices are grouped in pairs which are arranged on the top area and the bottom area of the sleeve-shaped missile body. For example, one pair may be mounted close to the front section of the sleeve-shaped missile body and/or one pair may be mounted close to the rear section of the sleeve-shaped missile body.

According to one aspect, the at least one aerodynamic extension comprises at least one aileron which is mounted to a trailing edge of the at least one aerodynamic extension.

According to one aspect, the at least one aileron comprises a control axis that is oriented at an oblique angle to the longitudinal axis of the sleeve-shaped missile body.

The at least one aerodynamic extension may comprise at least one aileron with a control axis that is oriented at an oblique angle, thereby allowing efficient control both in straight flight configuration and in oblique flight configuration. The at least one aileron preferably acts as an additional control surface in both flight configurations. Alternatively, the at least one aileron may comprise a control axis that is oriented in parallel or at a perpendicular angle to the longitudinal axis of the sleeve-shaped missile body.

According to one aspect, the guided missile further comprises at least one sensor that is mounted to the front section of the sleeve-shaped missile body.

According to one aspect, the guided missile further comprises at least one additional engine.

Advantageously, the guided missile may comprise multiple engines to enhance maneuverability. The multiple engines may be stacked in series, or arranged in parallel to each other.

According to one aspect, the at least one flight direction control device comprises a slat, a flap, a grid fin, a spoiler, an air brake, a morphing airfoil, a small rocket engine, a gas generator, and/or an explosive for flight direction control.

According to one aspect, the at least one engine comprises a rocket engine, an air breathing rocket, a turbine engine, a ram-jet, a scram-jet, and/or an electrically powered fan or propeller.

BRIEF DESCRIPTION OF THE DRAWINGS

Embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
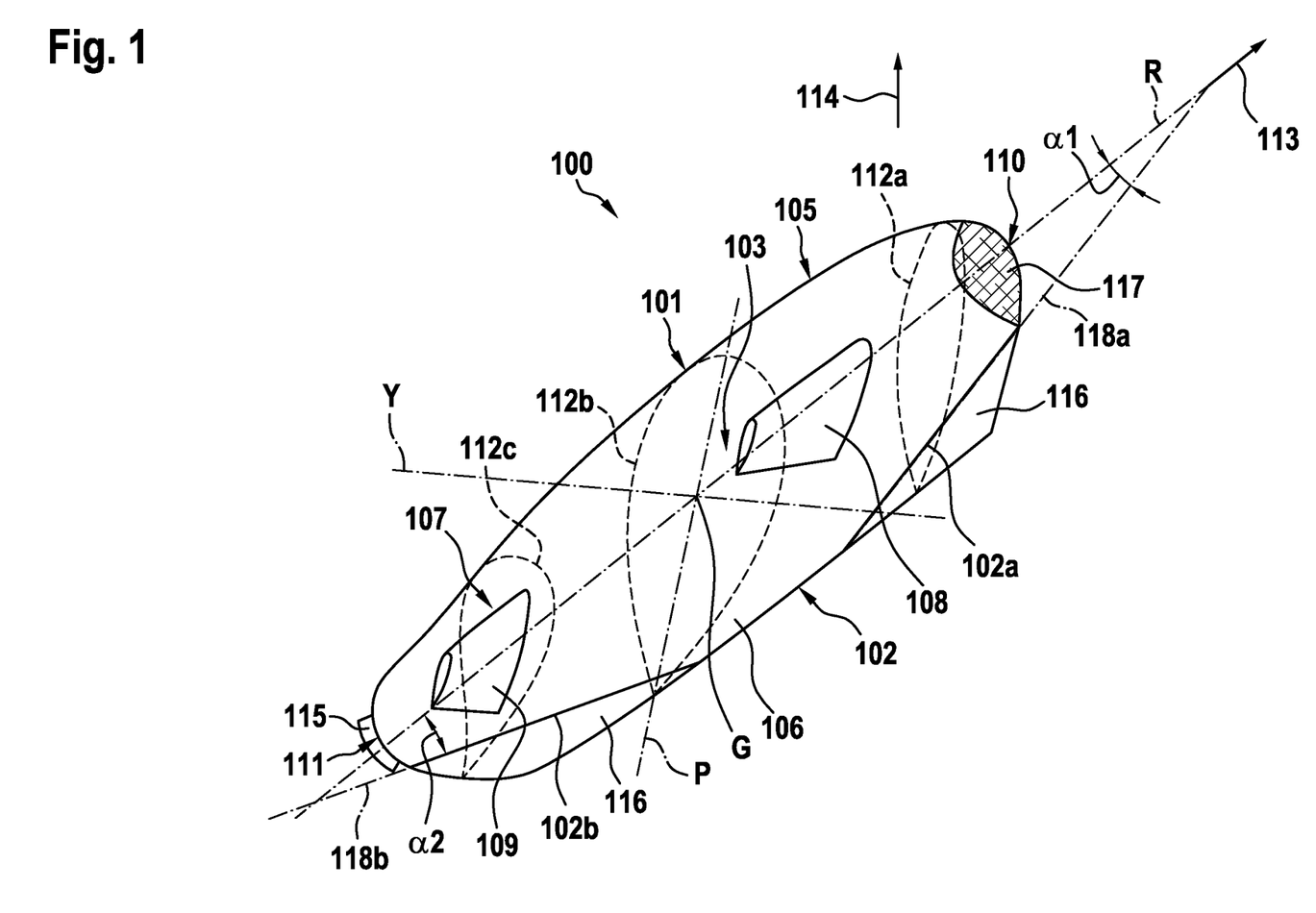
FIG. 1 shows a perspective view of a guided missile with an aerodynamic extension on its right-hand side.

FIG. 1 shows an exemplary guided missile 100 with a sleeve-shaped missile body 105. Illustratively, the sleeve-shaped missile body 105 extends along a longitudinal axis R from a front section 110 to a rear section 111, along a height axis Y from a bottom area (104 in FIG. 3a) to a top area 103, and along a transversal axis P from a left-hand side 101 to a right-hand side 102.

The sleeve-shaped missile body 105 may be made of metallic or composite materials with heat-absorbing materials or protective coatings. The front section 110 of the sleeve-shaped missile body 105 may be embodied as a conical, elliptical, or bulbous fairing.

If desired, the sleeve-shaped missile body 105 may comprise an internal compartment (not shown) for payload. For example, payload may comprise dedicated guidance, navigation, and control equipment, countermeasures equipment, and/or munitions of any type.

The guided missile 100 may comprise at least one sensor 117 that is preferably mounted to the front section 110 of the sleeve-shaped missile body 105. Various type of sensors 117 may be used. By way of example, radar sensors or optical sensors may be used.

Preferably, the guided missile 100 comprises at least one engine (300 in FIG. 3a) for producing forward thrust during operation. The at least one engine (300 in FIG. 3a) may be accommodated inside the sleeve-shaped missile body 105.

The at least one engine (300 in FIG. 3a) may comprise a nozzle 115 that is arranged at the rear section 111 of the sleeve-shaped missile body 105. Upon activation of the at least one engine (300 in FIG. 3a), expanding high-temperature gases may escape at high speeds through the nozzle 115.

Illustratively, the shape of the nozzle 115 is conical. Alternatively, the shape of the nozzle 115 may be cylindrical or any other suitable shape.

Preferably, the guided missile 100 comprises at least one flight direction control device 107 that is rotatably mounted to the top area 103 and/or the bottom area (104 in FIG. 3a) of the sleeve-shaped missile body 105. The at least one flight direction control device 107 may be provided for adjusting a flight direction 113, 114 of the guided missile 100.

Illustratively, the flight direction 113 is oriented in parallel to the longitudinal axis R and, thus, represents a straight flight direction. The flight direction 114, in turn, is oriented obliquely to the longitudinal axis R and, thus, represents an oblique flight direction.

The at least one flight direction control device 107 is preferably of the rudder type. The at least one flight direction control device 107 may be rotatable around the height axis Y by a rotation angle ($\alpha 1$, $\alpha 2$ in FIG. 2a and FIG. 2b) comprised between −45° to 135°, preferably between 0° and 90°.

More specifically, the at least one flight direction control device 107 may be used to control yaw of the guided missile 100. Accordingly, the flight direction 113, 114 of the guided missile 100 may preferably be controlled to be at least in a range comprised between 0° and 90°. In other words, an underlying angle between the straight flight direction 113 and the oblique flight direction 114 should preferably be controllable at least in the range comprised between 0° and 90°.

For controlling the rotation of the at least one flight direction control device 107 in operation, the guided missile 100 may comprise a conventional control system (not shown). The at least one flight direction control device 107 may be actuated by hydraulic or electrical power units, under control of the conventional control system.

The at least one flight direction control device 107 may be embodied as a wing-shaped flight direction control device 107. If desired, the at least one flight direction control device 107 may comprise a slat, a flap, a grid fin, a spoiler, an air brake, a morphing airfoil, a small rocket engine, a gas generator, and/or an explosive for flight direction control.

By way of example, the at least one flight direction control device 107 comprises a first flight direction control device 108 and a second flight direction control device 109. Illustratively, the first flight direction control device 108 is arranged in, or close to, the front section 110 of the sleeve-shaped missile body 105 and the second flight direction control device 109 is arranged in, or close to, the rear section 111 of the sleeve-shaped missile body 105. By way of example, the first and second flight direction control devices 108, 109 are rotatably mounted to the top area 103 of the sleeve-shaped missile body 105.

Preferably, the guided missile 100 comprises at least one aerodynamic extension 106 that is arranged on the left-hand side 101 and/or the right-hand side 102 of the sleeve-shaped missile body 105. The at least one aerodynamic extension 106 preferably comprises an aerodynamic cross-sectional shape 112a, 112b, 112c.

Illustratively, the guided missile 100 comprises an aerodynamic extension 106 that is arranged on the right-hand side 102 of the sleeve-shaped missile body 105. The aerodynamic cross-sectional shape 112a, 112b, 112c of the aerodynamic extension 106 forms an aerodynamic wing, by way of example.

Preferably, the at least one aerodynamic extension 106 forms together with the sleeve-shaped missile body 105 a lift-producing airfoil. Such a configuration is advantageous to produce additional lift during flight, as an overall sleeve-shaped missile body area is increased.

The aerodynamic extension 106 preferably extends from the front section 110 of the sleeve-shaped missile body 105 to the rear section 111 of the sleeve shaped missile body 105. Illustratively, the aerodynamic extension 106 is embodied as a truncated triangular prism.

Furthermore, the at least one aerodynamic extension 106 may comprise at least one aileron 116. The at least one aileron 116 may be mounted pivotably to a rear or trailing edge 102a, 102b of the at least one aerodynamic extension 106. The at least one aileron 116 may be a bi-directional aileron 116.

The at least one aileron 116 may be used to control movement of the guided missile 100 around the longitudinal axis R, i.e., rolling of the guided missile 100. The at least one aileron 116 thereby acts as an additional control surface.

The at least one aileron 116 may comprise a control axis 118a, 118b that is oriented at an oblique angle δ1, δ2 to the longitudinal axis R of the sleeve-shaped missile body 105. The control axis 118a, 118b oriented at an oblique angle δ1, δ2 allows efficient control both in straight flight direction and in oblique flight direction. If desired, the at least one aileron 116 may alternatively comprise a control axis 118a, 118b that is oriented in parallel or at a perpendicular angle to the longitudinal axis R of the sleeve-shaped missile body 105.

Illustratively, two ailerons 116 are pivotably mounted to the trailing edges 102a, 102b of the aerodynamic extension 106. The two ailerons 116 may extend from about a midpoint of the aerodynamic extension 106 outward toward a respective tip of the aerodynamic extension 106.

By way of example, a first aileron 116 is pivotably mounted to a front part of the trailing edge 102a of the aerodynamic extension 106 along a control axis 118a. The control axis 118a is oriented at an oblique angle δ1 to the longitudinal axis R of the sleeve-shaped missile body 105. The oblique angle δ1 may be comprised between 0° and 90°.

By way of example, a second aileron 116 is rotatably mounted to the rear part of the trailing edge 102b of the aerodynamic extension 106 along a control axis 118b. The control axis 118b is oriented at an oblique angle δ2 to the longitudinal axis R of the comprise between 0° and 90°.

Illustratively, a center of gravity G is embodied at a central position of the guided missile 100. The center of gravity G may be defined as an average location of weight of the guided missile 100. Illustratively, the longitudinal axis R, the transversal axis P and the height axis Y pass through the center of gravity G at 90° angles to each other. Whenever the guided missile 100 changes its flight attitude or position in flight, it rotates about one or more of the three axes. Illustratively, a most extended point of the aerodynamic extension 106 and/or a respective center of the aerodynamic extension 106 along the longitudinal axis R may be aligned with the center of gravity G.

Figure 2A:
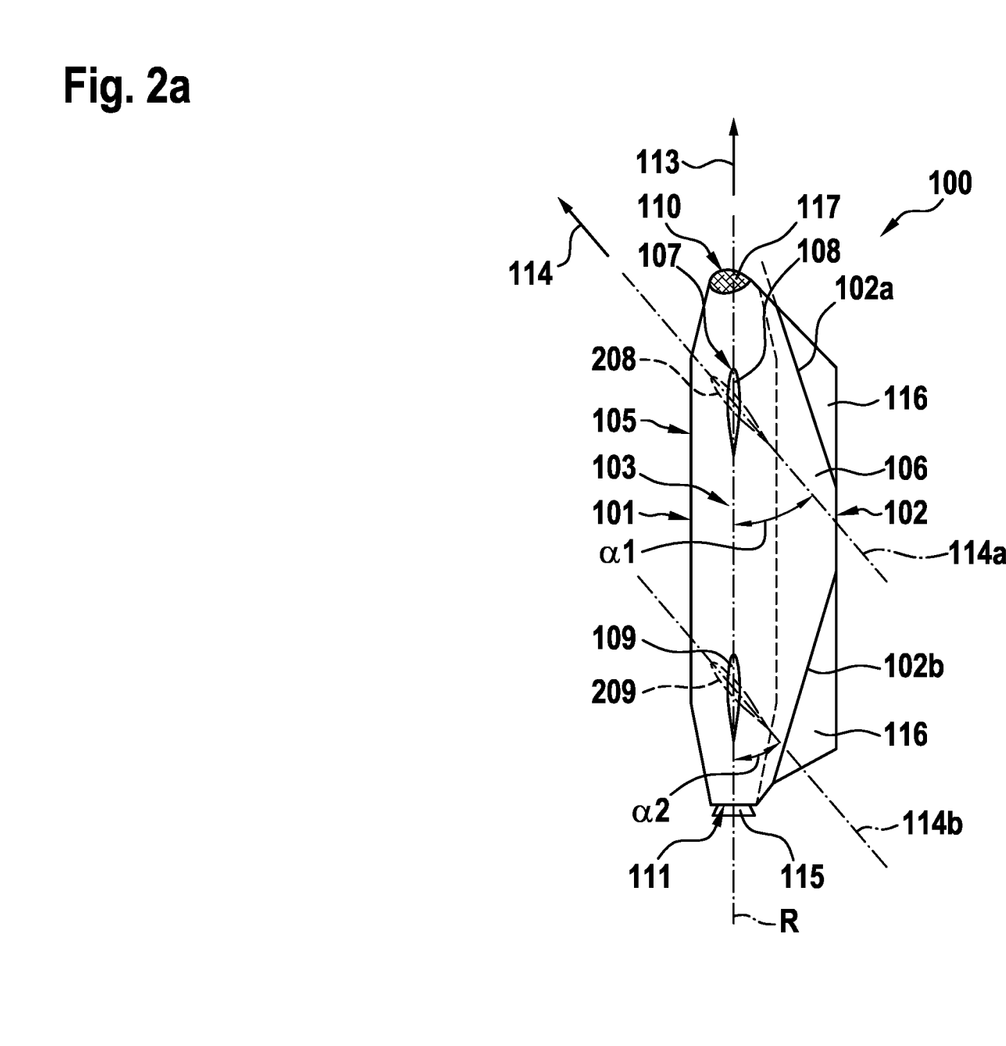
FIG. 2a shows a top view of the guided missile of FIG. 1 with the aerodynamic extension on the right-hand side.

FIG. 2a shows the guided missile 100 of FIG. 1 with the at least one aerodynamic extension 106 which is exemplarily arranged on the right-hand side 102 of the sleeve-shaped missile body 105. The guided missile 100 comprises the at least one flight direction control device 107. The at least one flight direction control device 107 is illustratively of the rudder type.

By way of example, the at least one flight direction control device 107 is rotatably mounted on the top area 103 of the sleeve-shaped missile body 105. The at least one flight control device 107 illustratively comprises the first flight direction control device 108 and the second flight direction control device 109. The first flight direction control device 108 is arranged close to the front section 110 of the sleeve-shaped missile body 105 and the second flight direction control device 109 is arranged close to the rear section 111 of the sleeve-shaped missile body 105.

Rotation of the first and/or second flight direction control devices 108, 109 changes airflow and pressure distribution over and around the guided missile 100. As indicated above, the first and second flight direction control devices 108, 109 may be rotatable around the height axis (Y in FIG. 1) by a rotation angle α1, α2 comprised between −45° and 135°. Thus, the flight direction 113, 114 may be controlled in the range between 0° et 90°.

By way of example, prior to launch or in a first flight configuration, the guided missile 100 travels in the straight flight direction 113 and the first and second flight direction control devices 108 are aligned with the longitudinal axis R of the guided missile 100. During operation, the first and second flight direction control devices 108, 109 may be rotated by rotation angles α1, α2 comprised between −45° and 135° such that the guided missile 100 changes its direction of flight from the straight flight direction 113 into the oblique flight direction 114.

More specifically, the first and second flight direction control devices 108, 109 are preferably embodied such that they may be rotated from a straight position to an oblique position in order to stabilize and control the guided missile 100 in the oblique flight direction 114. Thus, rotation of the first and second flight direction control devices 108, 109 causes transition from a flight configuration with the straight flight direction 113 to a flight configuration with the oblique flight direction 114.

For instance, in order to adjust a desired direction of flight of the guided missile 100, the first and second flight direction control devices 108, 109 are rotated into positions illustrated by means of dashed first and second flight direction control devices 208, 209. The dashed flight direction control devices 208, 209 illustratively define a length axes 114a, 114b which are parallel to the oblique flight direction 114.

After rotation of the first and second flight direction control devices 108, 109, the guided missile 100 is stabilized in order to fly in the oblique flight direction 114, without the need to rotate the front part 110 of the guided missile 100.

Figure 2B:
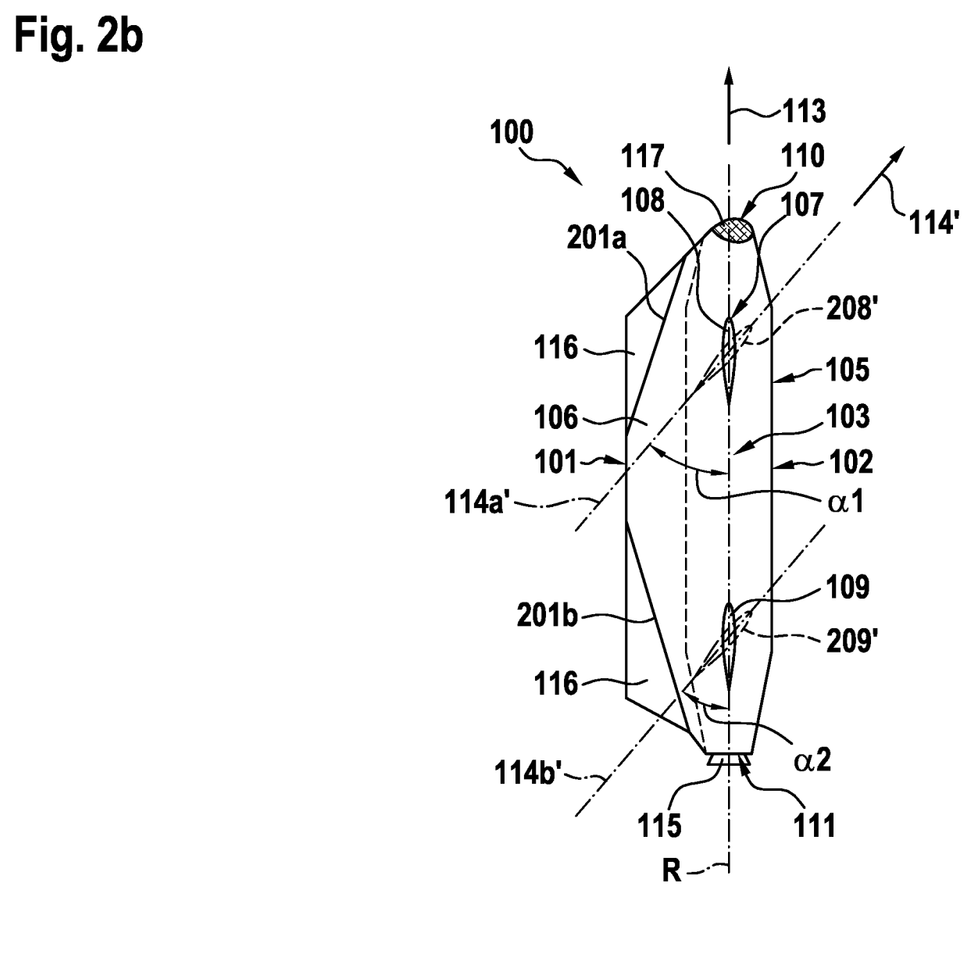
FIG. 2b shows a top view of the guided missile of FIG. 1 with an aerodynamic extension on its left-hand side.

FIG. 2b shows the guided missile 100 of FIG. 1 and FIG. 2a with the at least one aerodynamic extension 106. More specifically, FIG. 2b shows the guided missile 100 during flight in the straight flight direction 113 according to FIG. 1 and FIG. 2a, and after rotation of the first and second flight direction control devices 108, 109, indicated with dashed flight direction control devices 208', 209' which define length axes 114a', 114b', such that the guided missile 100 is adjusted to fly in an illustrative oblique flight direction 114'.

However, in contrast to FIG. 1 and FIG. 2a the at least one aerodynamic extension 106 is now exemplarily arranged on the left-hand side 101 of the sleeve-shaped missile body 105. Furthermore, the at least one aileron 116 is now pivotably mounted to a trailing edge 201a, 201b of the aerodynamic extension 106 on the left-hand side 101. By way of example, a first aileron 116 is pivotably mounted to a front part of the trailing edge 201a, and a second aileron 116 is pivotably mounted to a rear part of the trailing edge 201b. The two ailerons 116 may preferably pivot in opposite directions to create aerodynamic forces that cause the guided missile 100 to roll.

Figure 3A:
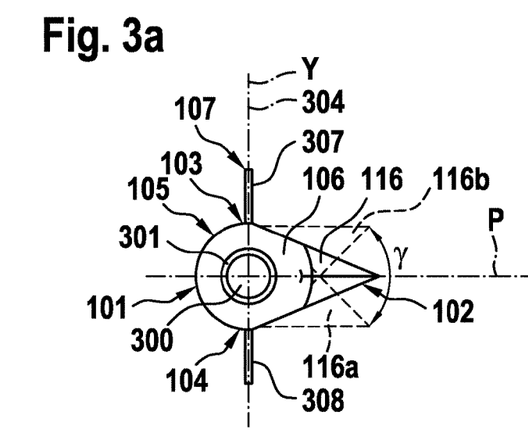
FIG. 3a shows a schematic cross-sectional view of the guided missile of FIG. 1 with a pair of flight direction control devices, in accordance with some embodiments.

FIG. 3a shows the guided missile 100 of FIG. 1 with the at least one flight direction control device 107 that is now illustratively embodied by a pair of first and second flight direction control devices 307, 308, both of which are of the rudder type, by way of example. The first flight direction control device 307 is illustratively rotatably mounted on the top area 103 of the sleeve-shaped missile body 105. The second flight direction control device 308 is illustratively rotatably mounted on the bottom area 104 of the sleeve-shaped missile body 105.

By way of example, the first flight direction control device 307 is rotatable around a rotation axis 304. The second flight direction control device 308 is similarly rotatable around the rotation axis 304. In other words, the first flight direction control device 307 and the second flight direction control device 308 share the common rotation axis 304, which is illustratively parallel to the height axis Y. The first flight direction control device 307 and the second flight direction control device 308 are illustratively symmetrical with respect to the transversal axis P of the sleeve-shaped missile body 105.

Furthermore, an internal compartment 301 is illustrated, which is located inside the sleeve-shaped missile body 105. The internal compartment 301 illustratively accommodates at least one engine 300. The at least one engine 300 may comprise a rocket engine, an air breathing rocket, a turbine engine, a ram-jet, a scram-jet, and/or an electrically powered fan or propeller.

As described above at FIG. 1, the sleeve-shaped missile body 105 is provided with the at least one aerodynamic extension 106 on the right-hand side 102. Furthermore, the at least one aileron 116 is pivotably mounted to the at least one aerodynamic extension 106. The at least one aileron 116 may be embodied as triangular prism.

More specifically, the at least one aileron 116 is illustratively pivotable between first and second positions 116a, 116b. By way of example, the at least one aileron 116 is pivotable by an angle γ. The angle γ may be comprised between 0° and 180°.

By way of example, the at least one aerodynamic extension 106 comprises two ailerons 116. Illustratively a first aileron is illustrated in the first position 116a, and a second aileron is illustrated in the second position 116b.

Figure 3B:
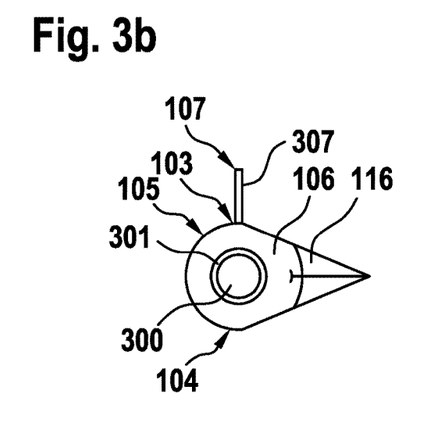
FIG. 3b shows a schematic cross-sectional view of the guided missile of FIG. 1 with a single flight direction control device, in accordance with some embodiments.

FIG. 3b shows the guided missile 100 of FIG. 1 with the at least one flight direction control device 107 that is now illustratively embodied only by means of the flight direction control device 307 of FIG. 3a. As described at FIG. 3a, the flight direction control device 307 is preferably rotatably mounted on the top area 103 of the sleeve-shaped missile body 105. However, if desired the flight direction control device 307 may alternatively be rotatably mounted on the bottom area 104 of the sleeve-shaped missile body 105.

Figure 3C:
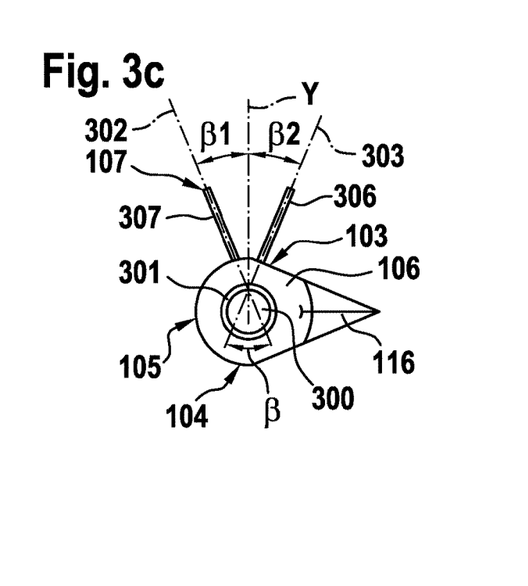
FIG. 3c shows a schematic cross-sectional view of the guided missile of FIG. 1 with a pair of flight direction control devices on the top area of the guided missile, in accordance with some embodiments.

FIG. 3c shows the guided missile 100 of FIG. 1 with the at least one flight direction control device 107 that is now illustratively embodied by a pair of first and second flight direction control devices, which comprise the flight direction control device 307 of FIG. 3b and an additional flight direction control device 306, which is preferably also of the rudder type. By way of example, the first and the second flight direction control devices 306, 307 are both rotatably mounted on the top area 103 of the sleeve-shaped missile body 105.

Illustratively, the first flight direction control device 307 is now rotatable around a rotation axis 302, and the second flight direction control device 306 is rotatable around a rotation axis 303. The rotation axes 302, 303 are arranged with an angle β relative to each other, by way of example. More specifically, the rotation axis 302 is preferably arranged at an oblique angle β1 with reference to the height axis Y. Similarly, the rotation axis 303 is arranged at an oblique angle β2 with reference to the height axis Y.

By way of example, β1 is equal to β2 with β1=β2=β/2. Thus, the first and second flight direction control devices 307, 306 are arranged symmetrically on the sleeve-shaped missile body 105 with respect to the height axis Y. However, if desired oblique angle β1 and oblique angle β2 may have different values.

Figure 3D:
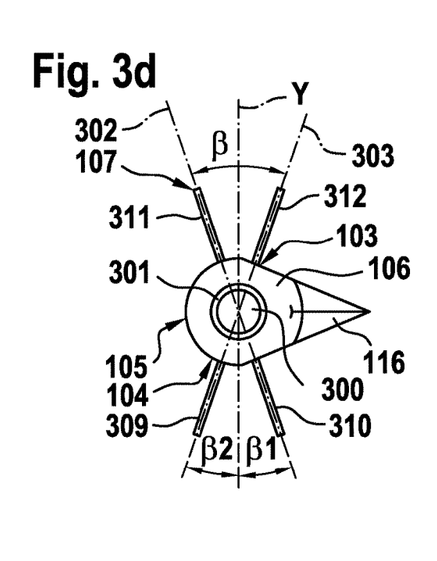
FIG. 3d shows a schematic cross-sectional view of the guided missile of FIG. 1 with two pairs of flight direction control devices, in accordance with some embodiments.

FIG. 3d shows the guided missile 100 of FIG. 1 with the at least one flight direction control device 107 that is now illustratively embodied by two pairs of first and second flight direction control devices 311, 312; 309, 310, all of which are of the rudder type, by way of example. More specifically, the two pairs comprise a first flight direction control device 311, a second flight direction control device 312, a third flight direction control device 309 and a fourth flight direction control device 310.

Illustratively, the first flight direction control device 311 and the second flight direction control device 312 are rotatably mounted on the top area 103 of the sleeve-shaped missile body 105. The third flight direction control device 309 and the fourth flight direction control device 310 are rotatably mounted on the bottom area 104 of the sleeve-shaped missile body 105.

By way of example, the first flight direction control device 311 and the fourth flight direction control device 310 are arranged on a common rotation axis 302. The second flight direction control device 312 and the third flight direction control device 309 are arranged on a common rotation axis 303. By way of example, in order to obtain an equal repartition of the weight, the rotation axes 302 and 303 are crossing at the center of the at least one engine 300.

Illustratively, the first flight direction control device 311 and the second flight direction control device 312 are arranged relative to each other at the oblique angle β of FIG. 3c. Similarly, the third flight direction control device 309 and the fourth flight direction control device 310 are also arranged at the oblique angle β.

Furthermore, the rotation axis 302 is preferably arranged at the oblique angle β1 of FIG. 3c with respect to the height axis Y and the rotation axis 303 is arranged at the oblique angle β2 with respect to the height axis Y. By way of example, β1 is equal to β2 with β1=β2=β/2. However, if desired oblique angle β1 and oblique angle β2 may have different values.

Figure 4A:
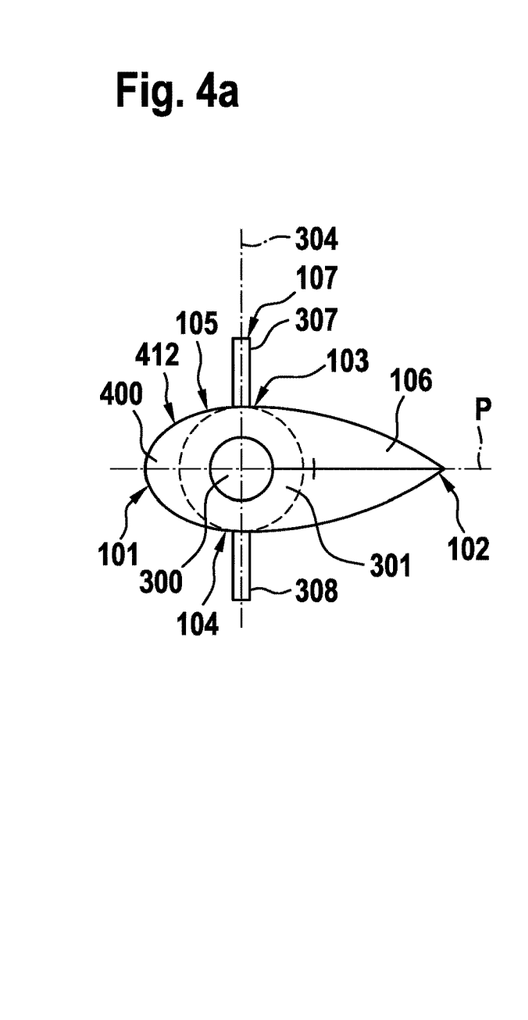
FIG. 4a shows a schematic cross-sectional view of the guided missile of FIG. 1 with a curved extension, in accordance with some embodiments.

FIG. 4a shows the guided missile 100 of FIG. 1 with the at least one aerodynamic extension 106 arranged on the right-hand side 102 of the sleeve-shaped missile body 105. By way of example, the guided missile 100 comprises the at least one flight direction control device 107 according to FIG. 3a, which comprises the first flight direction control device 307 that is rotatably mounted on the top area 103 the sleeve-shaped missile body 105, and the second flight direction control device 308 that is rotatably mounted on the bottom area 104 of the sleeve-shaped missile body 105. However, any other number, orientation and/or positioning of respective individual flight direction control devices may alternatively be considered.

In contrast to FIG. 1 and FIG. 3a, the sleeve-shaped missile body 105 is now further provided with a curved extension 400 arranged on the left-hand side 101. Provision of the curved extension 400 in addition to the at least one aerodynamic extension 106 may be more efficient for a flight in subsonic speed.

Illustratively, the cross-sectional profile of the curved extension 400, the sleeve-shaped missile body 105 and the at least one aerodynamic extension 106 together forms a wing airfoil 412. Implementation of the wing airfoil 412 may be advantageous in terms of lifting forces. Moreover, the wing airfoil 412 may reduce drag during flight of the guided missile.

Figure 4B:
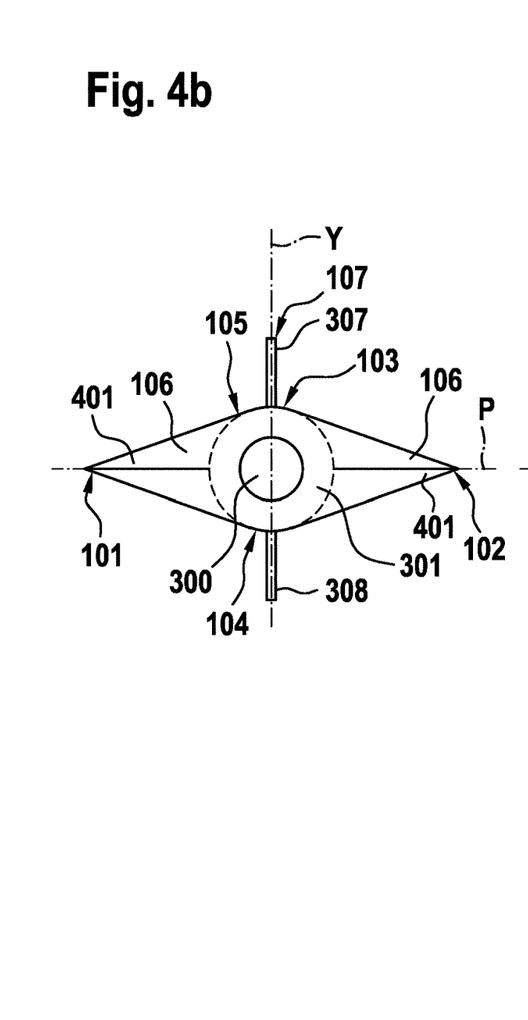
FIG. 4b shows a schematic cross-sectional view of the guided missile of FIG. 1 with an aerodynamic extension which comprises a sharp edge, in accordance with some embodiments.

FIG. 4b shows the guided missile 100 of FIG. 1 with the at least one aerodynamic extension 106 arranged on the right-hand side 102 of the sleeve-shaped missile body 105. By way of example, the guided missile 100 comprises the at least one flight direction control device 107 according to FIG. 3a, which comprises the first flight direction control device 307 that is rotatably mounted on the top area 103 the sleeve-shaped missile body 105, and the second flight direction control device 308 that is rotatably mounted on the bottom area 104 of the sleeve-shaped missile body 105. However, any other number, orientation and/or positioning of respective individual flight direction control devices may alternatively be considered.

However, in contrast to FIG. 1 and FIG. 3a the at least one aerodynamic extension 106 now also extends on the left-hand side 101 of the sleeve-shaped missile body 105. In other words, the at least one aerodynamic extension 106 is arranged on the left-hand side 101 of the sleeve-shaped missile body 105 and on the right-hand side 102 of the sleeve-shaped missile body 105. By way of example, the at least one aerodynamic extension 106 on the left-hand side 101 and on the right-hand side 102 of the sleeve-shaped missile body 105 respectively comprises a sharp edge 401. The sharp edge 401 may be advantageous for supersonic speed flight of the guided missile 100.

Furthermore, the guided missile 100 illustratively comprises the at least one engine 300 of FIG. 3a. By way of example, the at least one engine 300 is arranged centrally in the cross section of the sleeve-shaped missile body 105, which is advantageous in term of weight repartition.

Figure 4C:
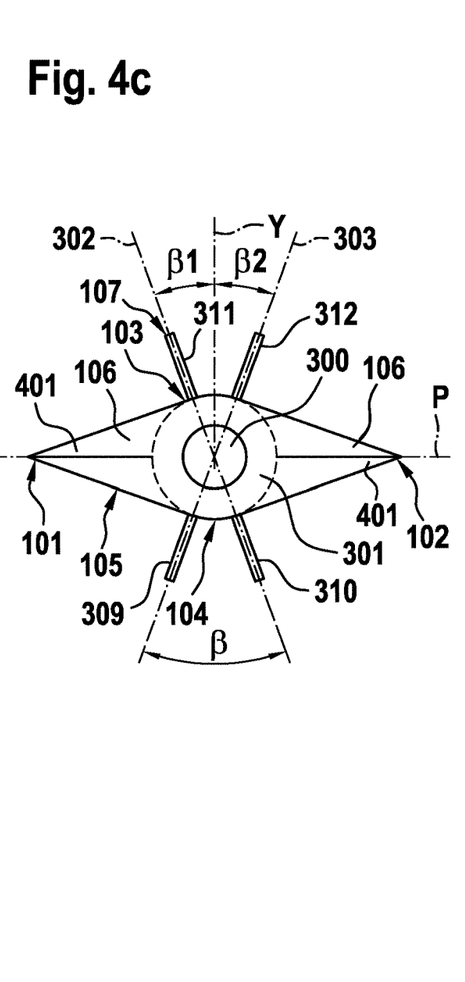
FIG. 4c shows a schematic cross-sectional view of the guided missile of FIG. 1 with two aerodynamic extensions which comprise a sharp edge, in accordance with some embodiments.

FIG. 4c shows the guided missile 100 of FIG. 1 with the at least one aerodynamic extension 106 that extends on the left-hand side 101 and on the right-hand side 102 of the sleeve-shaped missile body 105 according to FIG. 4b. Furthermore, the guided missile 100 illustratively comprises the at least one flight direction control device 107 of FIG. 1 that is illustratively embodied according to FIG. 3d, i.e., with the two pairs of first and second flight direction control devices 311, 312; 309, 310. However, a higher number of flight direction control devices may also be considered, which may be advantageous to change quickly and efficiently an underlying direction of flight of the guided missile 100 at supersonic speed.

Figure 5:
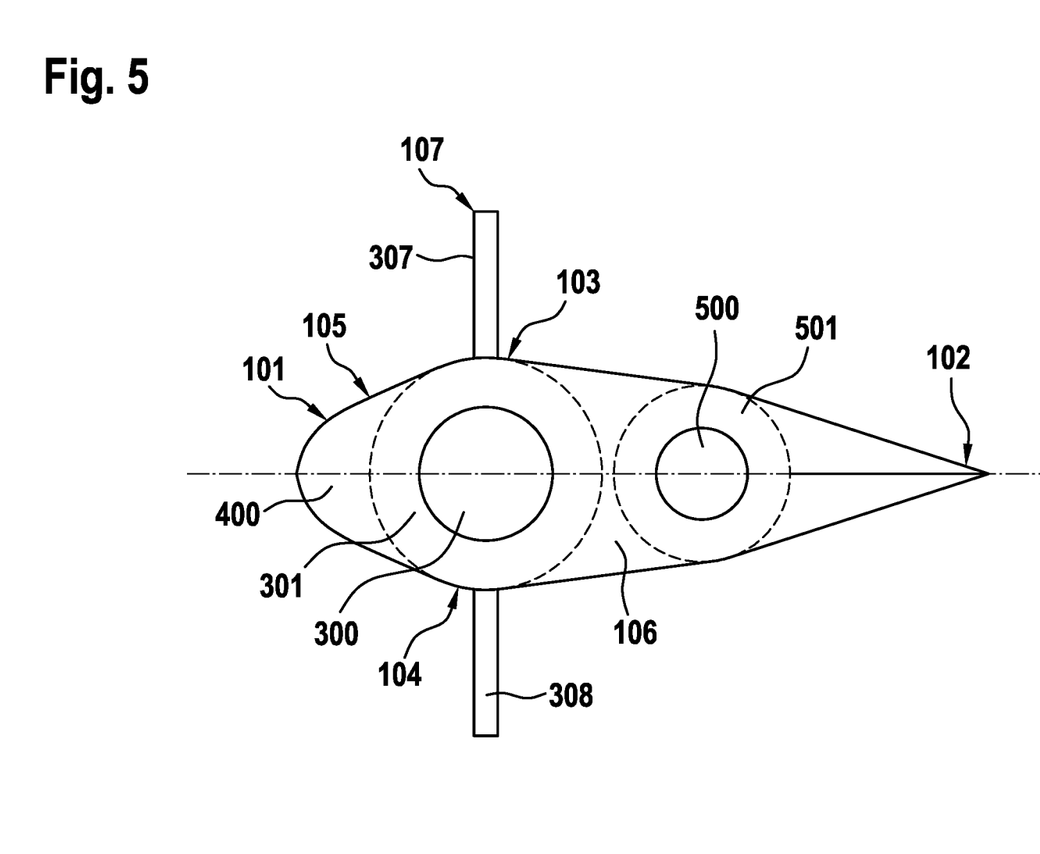
FIG. 5 shows a schematic cross-sectional view of the guided missile of FIG. 1 with an additional engine, in accordance with some embodiments.

FIG. 5 shows the guided missile 100 according to FIG. 4a with the sleeve-shaped missile body 105 and the at least one engine 300. However, in contrast to FIG. 4a, the guided missile 100 now preferably comprises an additional engine 500, which may also be provided for producing forward thrust.

Similar to the at least one engine 300, the additional engine 500 is preferably accommodated inside the sleeve-shaped missile body 105. Illustratively, the additional engine 500 is accommodated on the right-hand side 102 of the sleeve-shaped missile body 105 and, more specifically, on the right side of the at least one engine 300. By way of example, the at least one engine 300 and the additional engine 500 are arranged in parallel to each other.

If desired, the additional engine 500 may be accommodated as illustrated inside the at least one aerodynamic extension 106. More specifically, the sleeve-shaped missile body 105 preferably comprises an additional internal compartment 501, in which the additional engine 500 is located.

Preferably, the additional engine 500 is smaller than the at least one engine 300. However, if desired the additional engine 500 could have a similar size to the at least one engine 300.

Preferably, the additional engine 500 comprises a rocket engine, an air breathing rocket, a turbine engine, a ram-jet, a scram-jet, and/or an electrically powered fan or propeller.

It should be noted that the above-described embodiments are merely described to illustrate possible realizations of the present disclosure, but not in order to restrict the present disclosure thereto. Instead, multiple modifications and variations of the described embodiments are possible and should, therefore, also be considered as being part of the disclosure.

By way of example, any combination of flight direction control devices could be possible according to the disclosure. Furthermore, any number of additional engines could be used. If desired, the engines could be stacked in series inside the guided missile.

REFERENCE LIST

100 guided missile
101 left-hand side
102 right-hand side
102a, 201a trailing edge front part
102b, 201b trailing edge rear part
103 top area
104 bottom area
105 sleeve-shaped missile body
106 aerodynamic extension
107 multiplicity of flight direction control devices
108, 109, 306, 307, 308, 309, 310, 311, 312 individual flight direction control devices
110 front section
111 rear section
112a, 112b, 112c cross-sectional shape
113, 114, 114' flight direction 114a, 114b, 114a', 114b' axis of the flight direction control device
115 nozzle of the rocket engine
116 ailerons
116a, 116b position of aileron
117 sensor
118a, 118b control axis
208, 208' first flight direction control device after rotation
209, 209' second flight direction control device after rotation
300 engine
301 internal compartment
302, 303, 304 rotations axes
400 curved extension
401 sharp edge
412 wing airfoil
500 additional engine
501 additional internal compartment
R longitudinal axis
Y height axis
P transversal axis
G center of gravity
α1, α2 rotation angles
β1, β2, δ1, δ2 oblique angles
γ aileron pivot angle

What is claimed is:

1. A guided missile comprising:
   a sleeve-shaped missile body that extends along a longitudinal axis from a front section to a rear section, along a height axis from a bottom area to a top area, and along a transversal axis from a left-hand side to a right-hand side;
   at least one engine for producing forward thrust, the at least one engine being accommodated inside the sleeve-shaped missile body and comprising a nozzle that is arranged at the rear section of the sleeve-shaped missile body;
   at least one flight direction control device that is rotatably mounted to the top area or the bottom area of the sleeve-shaped missile body for adjusting a flight direction of the guided missile; and
   at least one aerodynamic extension with an aerodynamic cross-sectional shape that is arranged on one of the left-hand side or the right-hand side of the sleeve-shaped missile body, wherein the at least one aerodynamic extension forms together with the sleeve-shaped missile body a lift generating airfoil at an angle oblique to the longitudinal axis for producing additional lift during flight, and wherein a curved extension is arranged on the other one of the left-hand side or the right-hand side of the sleeve-shaped missile body.

2. The guided missile of claim 1, wherein the at least one flight direction control device is of the rudder type and rotatable around the height axis from a position aligned with the longitudinal axis by a rotation angle comprised between −45° and 135°.

3. The guided missile of claim 1, wherein a cross-sectional profile of the curved extension, the sleeve-shaped missile body and the at least one aerodynamic extension together form a wing airfoil.

4. The guided missile of claim 1, wherein the at least one aerodynamic extension comprises a sharp edge.

5. The guided missile of claim 1, comprising at least two flight direction control devices, wherein at least one first flight direction control device of the at least two flight direction control devices is rotatably mounted to the top area of the sleeve-shaped missile body, and wherein at least one second flight direction control device of the at least two flight direction control devices is rotatably mounted to the bottom area of the sleeve-shaped missile body.

6. The guided missile of claim 5, wherein the at least one first flight direction control device and the at least one second flight direction control device comprise rotation axes which are arranged coaxially or at an oblique angle with reference to the height axis.

7. The guided missile of claim 5, wherein the at least one first flight direction control device and the at least one second flight direction control device are arranged in, or close to, the front section of the sleeve-shaped missile body.

8. The guided missile of claim 5, wherein the at least one first flight direction control device and the at least one second flight direction control device are arranged in, or close to, the rear section of the sleeve-shaped missile body.

9. The guided missile of claim 1, wherein the at least one aerodynamic extension comprises at least one aileron which is mounted to a trailing edge of the at least one aerodynamic extension, wherein the trailing edge is an outer edge of the at least aerodynamic extension distal from the sleeve-shaped missile body.

10. The guided missile of claim 9, wherein the at least one aileron comprises a control that is oriented at an oblique angle to the longitudinal axis of the sleeve-shaped missile body.

11. The guided missile of claim 1, further comprising at least one sensor that is mounted to the front section of the sleeve-shaped missile body.

12. The guided missile of claim 1, further comprising at least one additional engine.

13. The guided missile of claim 1, wherein the at least one flight direction control device comprises one of a slat, a flap, a grid fin, a spoiler, an air brake, a morphing airfoil, a small rocket engine, a gas generator, or an explosive for flight direction control.

14. The guided missile of claim 1, wherein the at least one engine comprises one of a rocket engine, an air breathing rocket, a turbine engine, a ram-jet, a scram-jet, an electrically powered fan, or an electrically powered propeller.

15. A guided missile comprising:
    a sleeve-shaped missile body extending along a longitudinal axis from a front section to a rear section, along a height axis from a bottom area to a top area, and along a transversal axis from a left-hand side to a right-hand side;
    an engine for producing forward thrust, the engine disposed inside the sleeve-shaped missile body and comprising a nozzle disposed at the rear section of the sleeve-shaped missile body;
    a flight direction control device rotatably mounted to the top area or the bottom area of the sleeve-shaped missile body to enable adjusting a flight direction of the guided missile; and
    an aerodynamic extension with an aerodynamic cross-sectional shape disposed on one of the left-hand side or the right-hand side of the sleeve-shaped missile body, wherein the aerodynamic extension with the sleeve-shaped missile body forms a lift generating airfoil at an angle oblique to the longitudinal axis to enable producing additional lift during flight, and wherein a curved extension is disposed on the other one of the left-hand side or the right-hand side of the sleeve-shaped missile body.

16. The guided missile of claim 15, wherein the at least one flight direction control device is of the rudder type and rotatable around the height axis from a position aligned with the longitudinal axis by a rotation angle comprised between −45° and 135°.

17. The guided missile of claim 15, wherein a cross-sectional profile of the curved extension, the sleeve-shaped missile body and the aerodynamic extension together form a wing airfoil, and wherein the aerodynamic extension comprises a sharp edge.

18. The guided missile of claim 16, comprising two flight direction control devices, wherein a first flight direction control device of the two flight direction control devices is rotatably mounted to the top area of the sleeve-shaped missile body, and wherein a second flight direction control device of the two flight direction control devices is rotatably mounted to the bottom area of the sleeve-shaped missile body, and wherein the first flight direction control device and the second flight direction control device comprise rotation axes which are arranged coaxially or at an oblique angle with reference to the height axis.

19. The guided missile of claim 15, wherein the flight direction control device comprises one of a slat, a flap, a grid fin, a spoiler, an air brake, a morphing airfoil, a small rocket engine, a gas generator, or an explosive for flight direction control, and the engine comprises one of a rocket engine, an air breathing rocket, a turbine engine, a ram-jet, a scram-jet, an electrically powered fan, or an electrically powered propeller.

20. A guided missile comprising:
- a sleeve-shaped missile body extending i) from a front section to a rear section, ii) from a bottom area to a top area, and iii) from a left-hand side to a right-hand side;
- an engine for producing forward thrust and being accommodated inside the sleeve-shaped missile body, the engine comprising a nozzle at the rear section of the sleeve-shaped missile body;
- a flight direction control device rotatably mounted to the sleeve-shaped missile body for adjusting a flight direction of the guided missile; and
- an aerodynamic extension having an aerodynamic cross-sectional shape on one side of the sleeve-shaped missile body, wherein the aerodynamic extension forms together with the sleeve-shaped missile body a lift generating airfoil at an angle oblique to a longitudinal axis of the missile body for producing additional lift during flight, and wherein a curved extension is arranged on the other side of the sleeve-shaped missile body.

* * * * *